United States Patent [19]
Fiddes et al.

[11] Patent Number: 5,476,208
[45] Date of Patent: Dec. 19, 1995

[54] SUPERCONDUCTING JOINT FOR FOILS USED IN SUPERCONDUCTING MAGNETS

[75] Inventors: Neil G. Fiddes, Columbia; Christopher G. King, Florence; Anthony Mantone, Effingham; Frank D. Shaffer, Quimby, all of S.C.

[73] Assignee: General Electric Company, Milwaukee, Wis.

[21] Appl. No.: 148,303

[22] Filed: Nov. 8, 1993

[51] Int. Cl.[6] .............................. B23K 20/10; B23K 37/04
[52] U.S. Cl. ........................... 228/111; 228/213; 228/5.7; 29/599
[58] Field of Search .................................. 228/110.1, 111, 228/153, 212, 213, 170, 171, 5.7, 49.3; 29/599, 870, 872

[56] References Cited

U.S. PATENT DOCUMENTS

| | | | |
|---|---|---|---|
| 3,421,676 | 1/1969 | Jenkins | 228/5.7 |
| 4,765,532 | 8/1988 | Vomoti et al. | 228/5.7 |
| 5,104,028 | 4/1992 | Martincic et al. | 228/111 |
| 5,172,846 | 12/1992 | Hayashi et al. | 228/5.7 |

*Primary Examiner*—P. Austin Bradley
*Assistant Examiner*—Jeanne M. Elpel
*Attorney, Agent, or Firm*—Irving M. Freedman; John H. Pilarski

[57] ABSTRACT

Method for forming welded joints on superconducting foils to form long lengths of foil for use in superconducting magnet tapes including fixturing for controlling the accurate positioning of sheared foils and control of the overlap to be welded.

16 Claims, 3 Drawing Sheets

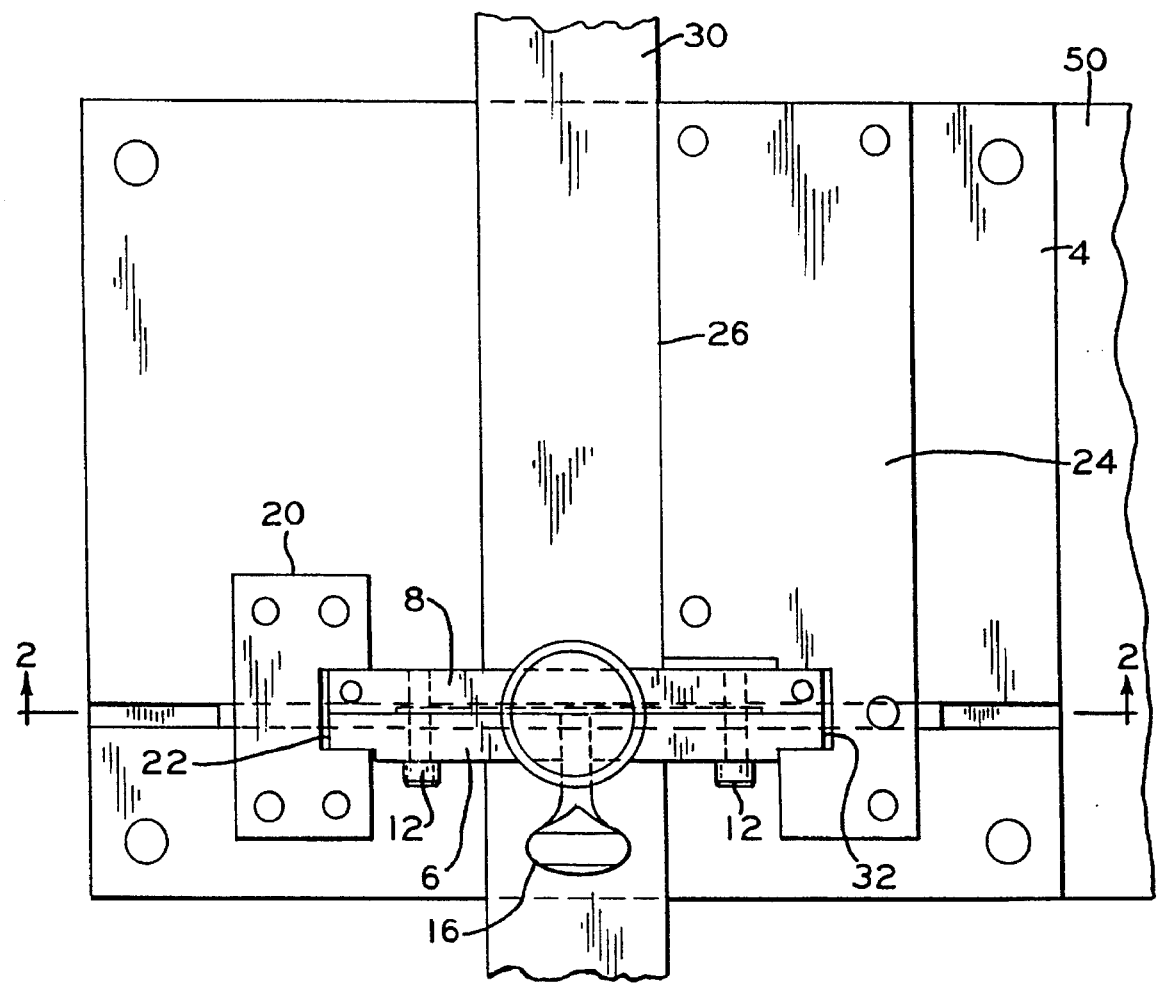
FIG_1
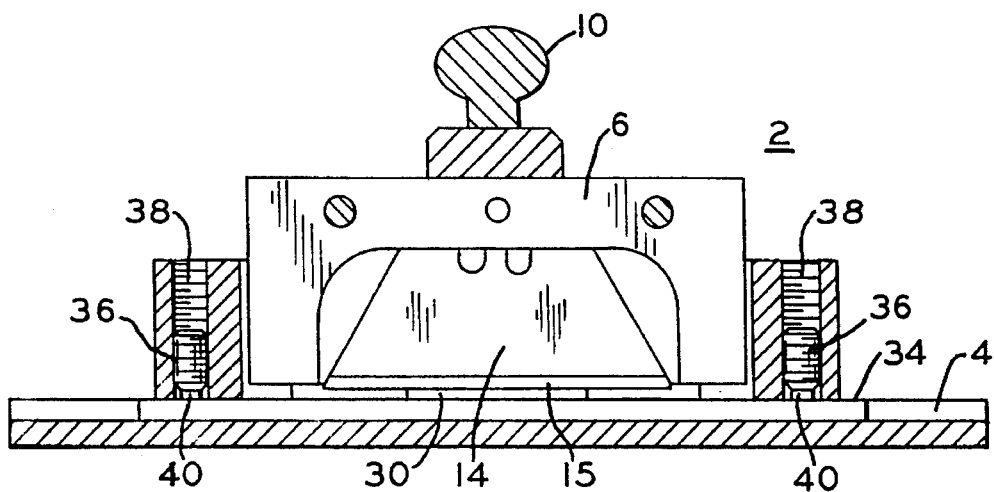
FIG_2

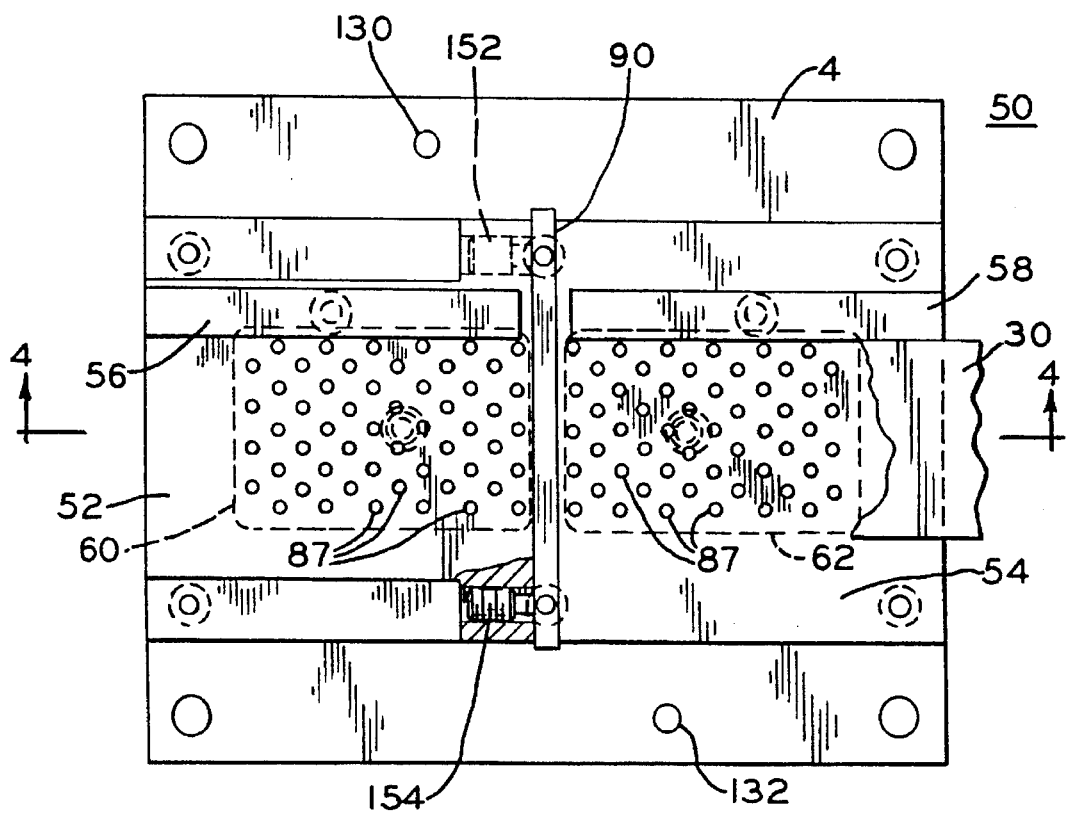
FIG_3
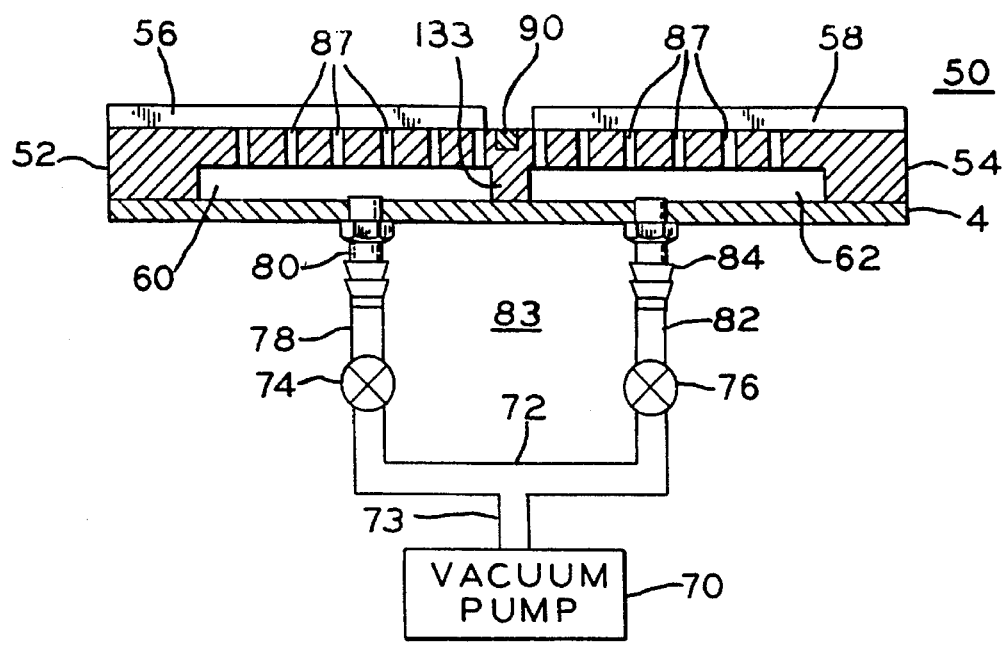
FIG_4

SUPERCONDUCTING JOINT FOR FOILS USED IN SUPERCONDUCTING MAGNETS

BACKGROUND OF INVENTION

This invention relates to an apparatus and method for joining foils used in superconducting magnet tape to provide a superconducting joint.

As is well known, a magnet can be made superconducting by placing it in an extremely cold environment, such as by enclosing it in a cryostat or pressure vessel containing liquid helium or other cryogen. The extreme cold reduces the resistance in the magnetic coils to negligible levels, such that when a power source is initially connected to the coil (for a period, for example, of ten minutes) to introduce a current flow through the coils, the current will continue to flow through the coils due to the negligible coil resistance even after power is removed, thereby maintaining a magnetic field. Superconducting magnets find wide application, for example, in the field of magnetic resonance imaging (hereinafter called "MRI").

Considerable research and development efforts have been directed at eliminating the need for a boiling cryogen, such as liquid helium, and in providing superconducting magnets which maintain the magnetic state and do not "quench," or discontinue superconductivity. However, the differential thermal expansion and contraction between materials in superconducting magnets, which are cycled from ambient temperature to temperatures in the range of absolute zero (−270° C.), and the extremely large magnetic forces provided, and utilized, in a MRI lead to conflicting characteristics required of the materials, used in MRI magnet coils. In addition, the desired superconducting magnet coil material such as $Nb_3Sn$ is often relatively brittle and difficult to handle in winding coils.

However, the manufacture of laminated tape suitable for superconducting use involves the lamination of long lengths of different materials such as niobium tin ($Nb_3Sn$) and copper by applying pressure while the $Nb_3Sn$ and copper foils are fed through a molten solder bath and pinched together. The manufacturing process involves passing the foils and tape through a plurality of manufacturing process stations where the foils and tape are for example cleaned, anodized, unwound from and wound onto spools, passed by idler pulleys, laminated, passed through a solder bath, cut into strips and insulated.

A portion of such a manufacturing process is disclosed in our co-pending U.S. patent application, Ser. No. 07/967,316, now U.S. Pat. No. 5,299,728 entitled "Method and Apparatus For Laminating Foils Into Superconducting Tape For Use In A Superconducting Magnet", assigned to the same assignee as the present invention.

A persistent problem encountered in the manufacture of laminated tape suitable for use in superconducting magnet coils is that the lengths of the foils required to form a magnet does not correspond to the lengths of foil obtainable from foil manufacturers. As a result there is frequently unused portions of expensive foil. In addition, the various manufacturing stations and processes frequently result in the loss of end portions of the foil being processed and the ability to add leaders and trailers, or small portions at the ends of the tape being processed is highly desirable in conserving the foils. It is thus important to be able to suitably join foils used in the manufacture of superconducting tapes. However, it is also extremely important that the joint not only be susceptible of being made superconducting but also minimize any heat generated across the joint which will occur during superconducting current flow since any heat generated will result in the boiling and necessary replacement of the helium. Moreover, in passing through various pinch areas and around pulleys during the manufacturing process, the joint must pass freely through various restricted regions without presenting any loose ends which could bend or get caught in restricted regions of the process equipment. Also, the joints must pass without damage through seals in manufacturing stations which are isolated from the surrounding atmosphere, with such seals and their use in superconducting tape manufacture being disclosed in our co-pending patent application entitled "Seal Assembly for Superconducting Magnet Tape Ovens", Ser. No. 07/923,427, now U.S. Pat. No. 5,332,867 and assigned to the same assignee as the present invention.

The length of foil supplied by foil manufacturers is not uniform and depends on the length obtained during their manufacturing process. Foil lengths vary in the range of from 5,000 to 9,000 feet long while up to 60,000 feet of superconducting tape is typically utilized in a superconducting magnet for MRI use. Joining foils with superconducting joint capabilities enables the manufacture of superconducting tapes for superconducting magnets which are longer than the foils supplied by foil manufacturers.

Existing foil welding apparatus and methods have not proven to be entirely satisfactory. Problems with superconducting ability and critical current flow across the weld for MRI applications are overcome by the present invention.

It thus becomes important to provide satisfactory joints for foils suitable for use in superconducting magnet tapes. It is important that a superconducting joint exhibit minimum heat loss during operation, and minimized overlap without loose or separable joints must be provided. Still further, it is important that the weld region not interfere with subsequent manufacturing operations involving embossing the tape and flowing liquid tin over the embossed surfaces as described, for example, in our co-pending patent application, Ser. No. 08/134,456 entitled "Apparatus For Embossing Superconducting Tape For Use In A Superconducting Magnet", assigned to the same assignee as the present invention. Joints formed by the present invention do not inhibit the proper flow of tin in forming $Nb_3Sn$ superconducting tape, particularly if the joints are rolled to reduce the thickness of the overlapped joint.

The ability to process longer lengths of foil formed by superconducting joints through use of the present invention at the start of the process of manufacturing laminated superconducting tapes can greatly reduce process cost through reductions in set up times at each step of the process, and increase the overall yield of the process, which in manufacturing $Nb_3Sn$ tape involves twelve separate serial processes or work stations.

OBJECTS AND SUMMARY OF INVENTION

It is an object of the present invention to provide an improved apparatus and method for joining foils used in superconducting tapes suitable for use in superconducting magnet coils.

It is another object of the present to provide an improved apparatus and method for joining foils used in superconducting tape which is suitable for use with thin foils of material, including brittle material for use in superconducting magnet coils.

It is yet another object of the present invention to provide an improved apparatus and method for joining thin foils which provides a strong superconducting joint with minimized overlap, and with maximum compactness which can withstand a multiple sequential processes used in the manufacturing of superconducting magnet tape such as $Nb_3Sn$ tape.

Still another object of the present invention is to provide an improved apparatus and method for joining foils used in superconducting magnet tape suitable for use in superconducting magnets in order to conserve materials, reduce cost and minimize the time required for the manufacture of the superconducting magnet tape.

A still further object of the present invention is to provide an improved apparatus and method for joining foils used in superconducting magnet tapes which overcomes problems of critical current flow across the joint and of superconducting ability of the tapes.

In accordance with one form of the invention, apparatus is provided for forming superconducting joints for superconducting foils used in the manufacture of superconducting magnet tapes providing square edge shearing, with foil handling and positioning to provide the overlapped foils under a guided welder path.

The square edge shearing includes a base over which the superconducting foils are positioned against a foil edge guide and a blade moveable within slots in a blade support frame which is perpendicular to the base and orthogonally positioned relative to the foil edge guide to enable the blade to be guided down over the foil at right angles to the length of the foil. A renewable insert surface on the base below the blade is provided such that the foil is clamped between the cutting edge of the blade and the surface provide a shear end perpendicular to the length of the foil. The renewable insert has a square cross-section which may be rotated and secured to the base to utilize all four surfaces of the insert.

The foil handling includes two adjacent foil perforated retaining surfaces having vacuum means to selectively retain the sheared ends of the tapes to be joined, with an edge guard for the foils and enabling the positioning of the sheared ends of the foils a preselected amount. The vacuum retains each foil in the overlapped position such that the ultrasonic welding head or horn may be guided over the overlapping portion to form a uniform superconducting joint.

The vacuum means include a perforated surface with a solenoid actuated valve connected to each perforated surface to enable the selective holding of the foil against the perforated surface when the vacuum is applied. A vacuum pump is connected through a parallel connection to a manifold in each of the foil handling or foil retaining portions.

The overlap distance is controlled by a reversible abutting foil guide to provide a stop against which the end of each foil is pushed to properly position each foil. After each foil is properly positioned it is held in position by the vacuum. The reversible foil guide includes a pair of offset pins which mate with cooperating sockets in the base to selectively position the stop in 2 positions, each spaced one half of the amount of the overlap from the axis between the pins to provide the preselected overlap. The ultrasonic welding horn may then be guided precisely over the overlap to provide a complete, compact and uniform ultrasonic weld with squared edges and suitable for passage through the various subsequent manufacturing procedures in the formation of the superconducting tape with a superconducting joint at the location of the weld.

BRIEF DESCRIPTION OF INVENTION

FIG. 1 shows the square edge shearing means of FIG. 8.

FIG. 2 is a cross-sectional view taken along lines 2—2 of FIG. 1.

FIG. 3 shows the foil handling and positioning portion of FIG. 8.

FIG. 4 is a cross-sectional view taken along lines 4—4 of FIG. 3 and in addition shows the connections from the vacuum pump.

Figure 8:
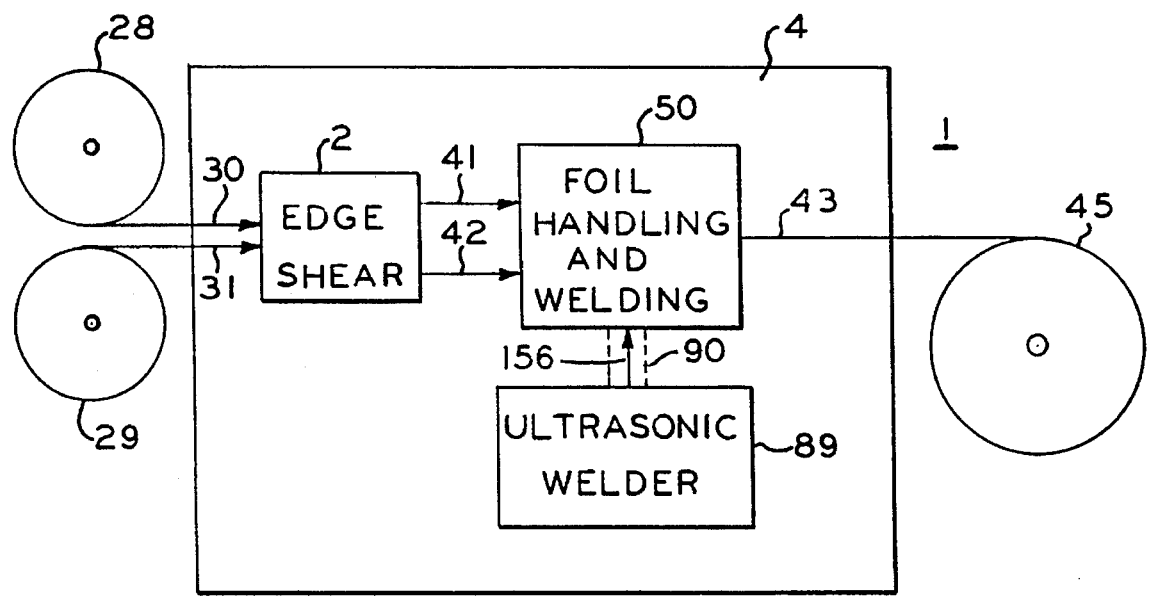
FIG. 8 shows one embodiment of the invention in simplified form.

Referring first to FIGS. 1, 2 and 8, edge shear 2 of weld fixture or work station 1 includes a pair of U-shaped cutter frames 6 and 8 fastened together by retaining screw 12 and including knob 10 at the top. Sandwiched and secured between frames 6 and 8 is a utility blade such as that sold by the Stanley Company under their designation number 11-911 and which includes a utility blade 14 with a cutting edge 15.

Cutter frame 6, 8 is precisely moveable within cutter guides or vertical slots 22 on cutter guide 20 and vertical slot 32 on foil and cutter guide 24.

Foil edge guide 26 extends perpendicular to blade 15 such that foil 30 which may be a NbZr alloy one inch wide is positioned by the foil edge guide to be exactly perpendicular to blade 14. As shown in FIG. 8, foil 30 may be the foil supply on rotatable spool 28 while foil 31 is the foil on rotatable spool 29 which are joined as described below. Insert 34 is a hardened and ground bar positioned directly under blade 15 such that tape 30 lies across insert 34 directly below the blade. Insert 34 has a square cross section and a pair of orthogonal bores at each end which enables all four surfaces along the length of the insert to be sequentially positioned on a recess in base 4 and secured in place by tightening threaded retaining screw 36 in threaded aperture 38. The reduced diameter end portions 40 of retaining screws 36 cooperate with the orthagonal bores of insert 34 to retain the insert in place with the desired surface exposed to blade 15.

After foil 30 is positioned against foil edge guard 26, blade 15 is moved into contact with the foil by downward pressure on handle 10 providing a firm, sharp, positive shearing surface of edge 15 across foil 30. Foil 30 may then be sheared by pulling upward on the foil against edge 15 in the region opposite retaining thumb screw 16.

Blade 14 can be replaced by removing U-shaped cutter frame 6, 8 from vertical slots 22 and 32 after which the U-shaped cutter frame portion 6 is separated from portion 8 by loosening of retaining screws 12. Blade 14 can then be removed and a replacement blade substituted, after which the cutter frame 6, 8 may be reassembled.

After foil 30 is sheared, the end of foil 31 is sheared and foils 30 and 31 placed on foil handling and welding means 50 which is positioned on base 4.

Referring next to FIGS. 3 and 4 in addition to FIG. 8, foil handling and welding means 50 includes a first foil retainer portion 52 and a second foil retainer portion 54 with a plurality of apertures 87 through the surfaces connected to manifolds 60 and 62, respectively, which are in turn connected through nipples 80 and 84, respectively, to a vacuum system 83. Vacuum system 83 includes vacuum pump 70 connected through conduit 73 to Y-connection 72 to provide a vacuum through solenoid actuated valves 74 and 76, respectively, and tubing 78 and 82, respectively, to foil retainers 52 and 54, respectively. Foil retainers 52 and 54 include foil guides 56 and 58, respectively, against which the edge of foils 30 and 31 are placed to overlie apertures 87 in regions 85 and 81, respectively, which retain each foil in place as long as a vacuum is applied by the selective actuation of solenoid valve 74 and 76. Foil handling and welding means 50 includes foil and weld positioner 120 shown in detail in FIGS. 5, 6, and 7.

Figures 5, 6, 7:
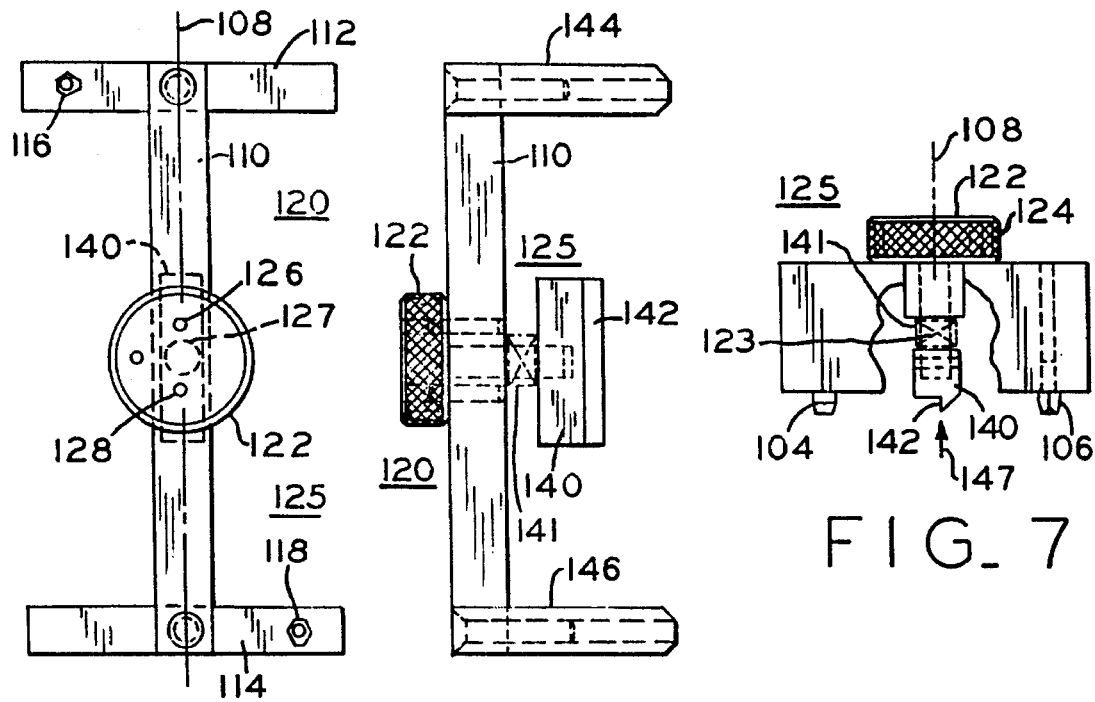
FIGS. 5–7 show the removable and reversible abutting foil guide of FIGS. 3 and 4 with FIG. 7 being enlarged.

Referring to FIGS. 5, 6, and 7 in addition to FIG. 3, foil handling and welding means 50 includes foil overlap guide 120 which includes longitudinal member 110 and a pair of transverse members 112 and 114 at the ends. Locator pins 116 on transverse member 112 is positioned on one side of the axis 108 of longitudinal member 110 while a second locating pin 118 is positioned on the opposite side of the axis of the longitudinal member on transverse member 114 with locator pins 116 and 118 equidistant from the axis.

Positioning apertures 130 and 132 (see FIG. 3) on base 4 are dimensioned to removably receive pins 116 and 118 to enable accurate placement of foil overlap guide 120 onto base 4 with overlap rotatable control 125 positioned in the region 133 between foil retainers 52 and 54. Two pairs of legs 144, 146 enable the stable positioning of foil overlap guide 120 on the work bench while preventing possible damaging of foil stop 142 through contact with the work bench.

FIG. 7 is enlarged view of overlap control 125. Referring to FIG. 7 in particular, and also to FIGS. 5 and 6, overlap control 125 includes handle 122 with knurled surface 124 mounted on longitudinal member 110 by positioning studs 104 and 106 cooperating with apertures 126 and 128 in the longitudinal member. Shaft 123 extends from handle 122 through aperture 127 in the center of longitudinal member 110. Overlap foil stop 140 threaded to the end of shaft 123 includes a notched bottom portion providing foil stop 142 against which the sheared ends of the foils 30 and 31 are moved in order to position them properly on foil retainers 52 and 54. The distance between the center of rotation of shaft 123 and of axis 108 to foil stop 142 is selected to be half the total distance of the overlap of the foils to be joined. That is, the overlap of the foils to be joined is twice the offset of foil stop 142 from axis 108 as described in more detail below. In using the subject invention it may be desirable to have a plurality of overlap controls 125 to be able to selectively provide the amount of overlap desired for a particular type of foil or material. Foil overlap guide 120 is mounted on base 4 by mounting post 144 and 146 positioned within positioning apertures and secured in place by transverse fasteners 152 and 154 respectively, to ensure that foil stop 142 is perpendicular to foil guides 56 and 58.

In positioning and welding the sheared ends of two foils, the foils are placed in an initial position on foil retainers 52 and 54 with the sheared end separated by, but proximate to, foil overlap guide 120.

That is, each foil such as foil 30 (partially shown by way of example in FIG. 3 on foil retainer 54) is placed overlying apertures 87 and the related solenoid actuated valves 74 and 76 are opened to provide a vacuum to retain the foil in the approximate positions on either side of foil stop 142 with the sheared edge of foil 30 perpendicular to foil guide 58. Solenoid activated valve 76 is then opened enabling the operator to slide foil 30 the short remaining distance into contact with foil stop 142 to provide half the desired overlap between foil stop 142 and axis 108 as shown generally by arrow 147 in FIG. 7. Solenoid activated valve 76 is then energized to the open position to retain foil 30 in the accurately determined overlap or weld position. It is possible to initially position foil 30 in contact with foil stop 142 before activating valve 76 to retain foil 30. Foil 31 may then be positioned with overlap as described below.

Overlap control 125 is then raised against spring 141 and foil stop 142 is rotated 180° through rotation of handle 122 to position the foil stop on the opposite side of axis 108 to receive the second foil 31. After solenoid valve 74 is closed to discontinue the vacuum retention of foil 31, foil 31 is slid the short distance over foil retainer 52 along and against foil guide 56 from its initial vacuum retained position to abut foil stop 142 in the manner described above for first foil 30. Thus, each foil is freed to move by closing its associated solenoid valve 74, 76 while the foil is slid the short distance along foil guides 56, 58 until the sheared ends contact foil stop 142. The total overlap is precisely twice the distance 147 determined by the offset of foil stop 142 and axis 108. After the second foil 31 is positioned against foil stop 142, solenoid valve 74 is actuated to retain the second foil 31 in final overlapping position for welding.

Foil overlap guide 120 is then removed from its position overlying insert or anvil 90. Ultrasonic horn shown generally as arrow 156 is guided to pass precisely over the foil 30, 31 overlap region which has been positioned over insert 90 secured in base 4 by suitable fasteners such as set screws 152 and 154. Insert 90 is a square cross section enabling selective positioning of one of the four surfaces to the path of ultrasonic horn 156. The size of ultrasonic horn 156 is selected to provide a weld with precisely compatible with the selected foil overlap width. Ultrasonic horn 156 is guided in passage or slot 133 between foil retainers 52 and 54. The frequency of ultrasonic welder 89 is adjusted to provided a resonance and maximum and complete welding as is well known in the art.

A combination of weld passes such as a double pass on each side of the weld may be used.

By way of summary and with reference to FIG. 8, foil handling and welding means 50 is positioned on base 4 with associated ultrasonic welder 89 and edge shear 2 which provides a first sheared squared foil 41 and a second sheared squared foil 42 from edge shear 2 which is provided with foils 30 and 31, respectively from rotatable supply spools 28 and 29, respectively. First sheared foil 41 and second sheared foil 42 are positioned through use of foil handling and welding fixture 50 to place the first and second sheared foils in precise and desired overlapping positions to be subsequently welded by welding horn 90 of ultrasonic welder 89 which is precisely guided over the overlap formed between the first and second sheared foils. Superconducting foil 43 in consisting of the welded foils 41 and 42 plus a superconducting joint may then be fed to take up spool 45, or alternatively spooled back onto supply spool 28 or 29, to provide an increased length of superconducting foil for use in the process of manufacturing laminated superconducting tapes for superconducting magnets.

The present invention may thus be adjusted to provide various width welds suitable for use with various foils and has been found to provide a joint of minimized width and thickness which is superconducting in use and suitable for passing through the various stages of the superconducting magnet tape manufacturing process such as the 12 separate work stations or processes used in making $Nb_3Sn$ tape. Tapes formed utilizing welded foils of the present invention are suitable for use in winding superconducting magnet coils, such as coils used in MRIs.

While the present invention has been described with respect to certain preferred embodiments thereof, it is to be understood that numerous variations in the details of construction, the arrangement and combination of parts, and the type and configuration of materials used may be made without departing from the spirit and scope of the invention.

What we claim is:

1. A method of forming joints for foils used in superconducting magnet tape comprising:

shearing the ends of the foils to be joined to provide ends perpendicular to the length of said foils;

initially positioning one end of each of said foils on a separate portion of a welding fixture in contact with a foil edge guide;

actuating a control valve to provide a vacuum to retain said foils on said welding fixture in the initial position;

positioning a foil stop guide in a first foil stop position between said foils;

discontinuing the vacuum on one of said foils and moving said one foil along said edge guide until the end of said one foil contacts said foil stop guide;

actuating said vacuum to said one of said foils to retain it in a final welding position;

providing a foil stop guide in a second foil stop position which is offset from said first foil stop position a predetermined distance from said first foil stop;

discontinuing the vacuum on the other of said foils and moving said other of said foils along said edge guide until the end of said other of said foils contacts the foil stop in said second foil stop position;

actuating the vacuum to said other of said foils to retain it in a final weld position in which the overlap of said other of said foils over said one foil is determined by said predetermined position; and welding along said overlap.

2. The superconducting joint forming method of claim 1 wherein said foil stop guide is positioned on a rotatable member, and the additional step of rotating said foil stop 180 degrees from an initial stop position to a final stop position parallel to said initial stop position, perpendicular to said foil edge guard and separated by said overlap.

3. The superconducting joint forming method of claim 2 wherein said welding is ultrasonic welding and wherein the welding horn is selected to provide a weld substantially as wide as said overlap when passed over said overlap in a predetermined number of passes, and said welding horn is passed over said overlap to weld said joint.

4. The superconducting joint forming method of claim 3 wherein welding guides are provided to move said horn across said overlap perpendicular to said edge guide, and the additional step of guiding said horn along said welding guides.

5. The superconducting joint forming method of claim 4 wherein the vacuum applied to said foils is controlled by electrical switches connected to two solenoid actuated valves interposed between said foils and a vacuum pump, and independently actuating the switches to said solenoid valves to selectively actuate said vacuum to retain said one foil in said initial position and selectively discontinuing said vacuum while sliding said one foil against said foil stop guide.

6. The superconducting joint forming method of claim 5 wherein said shearing is accomplished through use of a vertically moveable blade positioned perpendicular to a foil edge guide, and the additional steps of feeding said foils from a supply along said foil edge guide and subsequently forcing said blade against said foil for the shearing of said foils.

7. The superconducting joint forming method of claim 5 including the additional step of feeding said foils which have been welded are fed onto a takeup spool for further processing into superconducting magnet tape for magnetic resonance imaging applications.

8. A method of forming joints for foils used in superconducting magnet tape comprising:

positioning one end of a first foil and one end of a second foil on separate portions of a welding fixture contiguous to a foil edge guide in an initial position with said ends separated;

actuating retaining means to retain said first foil on said welding fixture in said initial position;

moving said second foil along said edge guide until said one end of said second foil contacts a foil stop guide positioned in a first foil stop position between said foils;

actuating said retaining means to retain said second foil in a final welding position;

positioning a foil stop guide in a second foil stop position offset a predetermined distance from said first foil stop;

moving said first foil along said edge guide until said one end of said first foil contacts said second foil stop position;

actuating said retaining means to retain said second of said foils in a final weld position in which the overlap of said second of said foils over said first of said foils is determined by said predetermined position; and welding said foils along said overlap.

9. The method of forming superconducting magnet tape joints of claim 8 wherein said retaining means includes a vacuum and at least one control valve, and actuating said control valve to actuate said retaining means to retain said foils on said welding fixture.

10. The superconducting joint forming method of claim 9 wherein said foil stop guide is positioned on a rotatable member, and the additional stop of rotating said foil stop 180 degrees from an initial stop position to a final stop position parallel to said initial stop position, perpendicular to said foil edge guard and separated by said overlap.

11. The superconducting joint forming method of claim 10 wherein said welding is ultrasonic wedding and wherein the welding horn is selected to provide a weld substantially as wide as said overlap when passed over said overlap in a predetermined number of passes, and said welding horn is passed over said overlap to weld said joint.

12. The superconducting joint forming method of claim 11 wherein welding guides are provided to move said horn across said overlap perpendicular to said edge guide, and the additional step of moving said horn along said welding guides.

13. The superconducting joint forming method of claim 12 wherein said at least one control valve is two solenoid actuated valves and the vacuum applied to said foils is controlled by electrical switches connected to said solenoid actuated valves and which are interposed between said foils and a vacuum pump, and independently actuating said switches to said solenoid actuated valves to selectively actuate said vacuum to retain said first foil in said initial position and selectively discontinuing said vacuum while sliding said first foil along said foil stop guide.

14. The superconducting joint formed method of claim 13 wherein said shearing is accomplished through use of a vertically moveable blade positioned perpendicular to a foil edge guide, and the additional steps of feeding said foils from a supply along said foil edge guide and subsequently forcing said blade against said foil for the shearing of said foils.

15. The superconducting joint forming method of claim 14 including the additional step of feeding said foils which have been welded onto a takeup spool for further processing into superconducting magnet tape for magnetic resonance imaging applications.

16. The method of forming superconducting magnet take joints of claim 15 including the additional step of shearing said one ends of said foils to provide ends perpendicular to the length of said foils prior to positioning the ends on said welding fixture.

* * * * *